May 19, 1936.　　　J. R. CAUTLEY　　　2,041,457
BRAKE COOLING MEANS
Filed July 1, 1932　　　2 Sheets-Sheet 1

INVENTOR.
JOHN R. CAUTLEY
BY
ATTORNEY

May 19, 1936.    J. R. CAUTLEY    2,041,457
BRAKE COOLING MEANS
Filed July 1, 1932    2 Sheets-Sheet 2

INVENTOR.
JOHN R. CAUTLEY
BY
ATTORNEY

Patented May 19, 1936

2,041,457

UNITED STATES PATENT OFFICE 2,041,457

BRAKE COOLING MEANS

John R. Cautley, South Bend, Ind., assignor to Bendix Aviation Corporation, South Bend, Ind., a corporation of Delaware Application July 1, 1932, Serial No. 620,516

12 Claims. (Cl. 188—264)

This invention relates to wheels and more particularly to wheels having brake drums provided with cooling means preferably by evaporative cooling.

Broadly, the invention comprehends a wheel including a brake drum having means associated therewith for the dissipation of heat generated by braking effort.

In the preferred embodiment of the invention the drum has a cooling chamber thereon provided with a blow-off valve, and in another embodiment of the invention the cooling chamber is connected to a condenser.

It is well established that metal will absorb approximately ten per cent as much heat by volume as will water, however, water will only absorb one B. t. u. per pound per degree rise in temperature. On the other hand the latent heat of evaporation of water is 778 B. t. u. per pound per degree; therefore, if one pound of water be evaporated at higher temperature than atmospheric pressure, it will absorb somewhere in the neighborhood of 800 B. t. u. per pound, due to this evaporation.

In an airplane wheel this means of dissipating heat may be utilized in a very valuable way without resorting to any process of condensation. It is well known that the energy which must be absorbed and dissipated in stopping a four thousand pound airplane having a landing speed of approximately sixty miles an hour is in the neighborhood of 400 B. t. u., this being approximately sixty per cent of the total energy, the remaining forty per cent being absorbed or dissipated by air resistance, etc.

Since there are two wheels on the normal airplane, it will be necessary to absorb or dissipate through each wheel approximately 200 B. t. u. This would mean the evaporation of approximately one quarter of a pound of water. These same figures would hold true in proportion with various sizes.

With a maximum of one pound of water in each wheel, the plane could be landed with brakes fully applied, (though this is not generally resorted to) four times before there would be any need of refilling the chamber provided the chamber is equipped with a conventional blow-off valve to permit the escape of steam. The quantity of water, or other cooling medium used, in cooling the brake drum would not be an objectionable weight and this would provide a highly desirable method of dissipating braking energy and keeping the brakes cool, and more especially the wheel and the rim thereof supporting the tire, such temperatures being retained at a relatively low degree which would not affect the tire beads or tubes, a serious objection which is now inherent in the present day wheel structures, the heat generally causing degeneration of the tube and tire.

This invention is in no way to be considered comparable with a water cooled brake drum, such structures being relatively old in the art. The present invention comprehends broadly the evaporative feature which makes it highly desirable because of the low weight required.

An object of the invention is to provide a brake drum having a cooling means including an evaporative means.

Another object of the invention is to provide a brake drum having a cooling means including a chamber associated with the drum, and means for permitting the vapor to escape from the chamber.

A feature of the invention is a brake drum including a braking flange and an annular chamber surrounding the flange, and a safety valve communicating with the chamber.

Other objects and features of the invention will appear from the following description taken in connection with the drawings which form a part of this specification, and in which.

Figure 1:
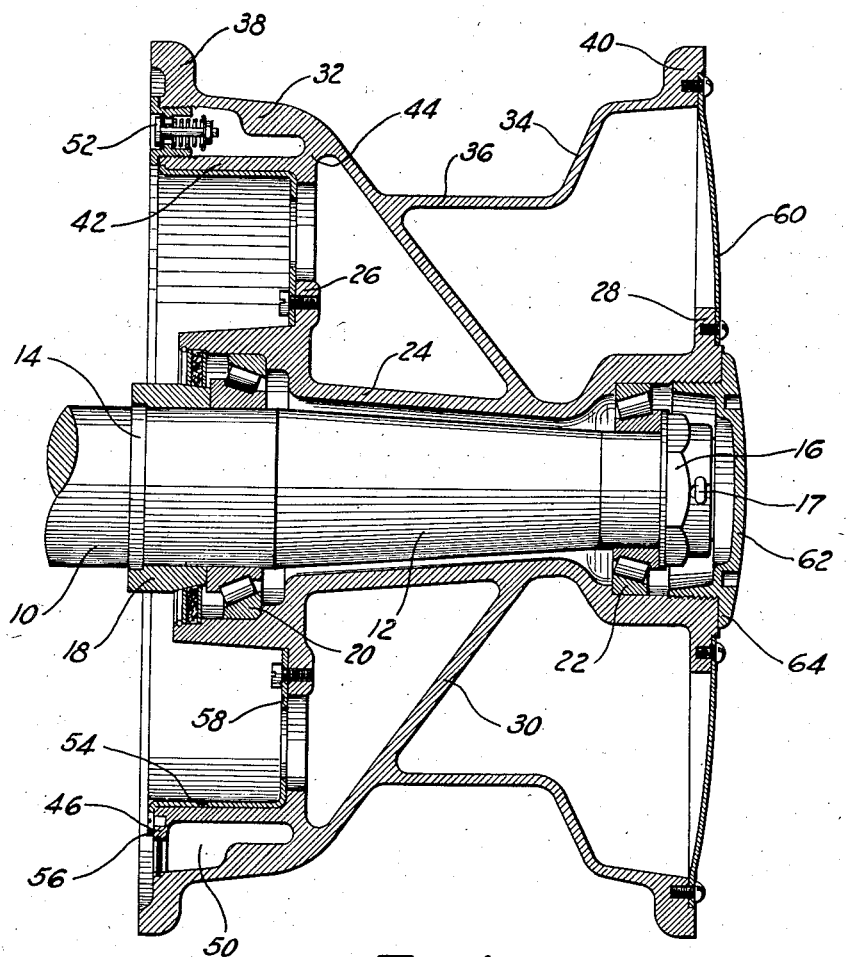
Figure 1 is a vertical sectional view of a wheel embodying the invention.

Referring to the drawings for more specific details of the invention, 10 represents an axle having a spindle 12. The spindle has a shoulder 14 and threaded on the end of the spindle is a suitable retaining nut 16 secured against displacement as by a cotter pin 17. The spindle supports a sleeve 18 and suitable races 20 and 22. The race 20 engages the sleeve 18 and race 22 engages the retaining nut 16, and positioned on the races is a wheel embodying the invention.

The wheel comprises a single casting including a hub 24 having spaced circumferential flanges 26 and 28, and a frustum 30 concentric to the hub. The smaller end of the frustum is spaced from the front end of the hub and the base of the frustum is in a line parallel and adjacent to the rear end of the hub. The base of the frustum terminates in a flange 32 which provides in conjunction with a lateral flange 34 a suitable tire rim having a channel 36 and retaining flanges 38 and 40.

Formed integral with the frustum is a brake drum 42. This drum is connected to the frustum substantially at the base thereof by a web 44 and to the retaining flange 38 by a web 46 having openings therein to facilitate in casting, the openings being closed by the conventional Welch plugs to provide a closed chamber 50 entirely surrounding the braking flange 42. The chamber is provided with a blow-off valve 52 which may also be used for the purpose of filling the chamber with a cooling fluid.

The drum 42 has secured therein a liner 54 provided with a circumferential flange 56 suitably secured to the edge of the drum. The liner is supported by a radial load-carrying disk 58 secured to the peripheral flange 26 on the hub. This structure materially strengthens the wheel.

Suitably secured to the circumferential flange 28 on the hub 24 is a radial load-carrying disk 60 having its periphery suitably secured to the retaining flange 40 and threaded in the hub is a cap 62 having a flange 64 abutting the hub.

In practice the chamber 50 is partially filled with water to cool the braking flange 42 for the dissipation of heat generated by the braking effort. To more effectively provide for the dissipation of the heat, it is proposed to equip the chamber 50 with a blow-off valve 52, so that when the water is vaporized at a higher than atmospheric pressure it will escape and thereby greatly enhance the cooling effect due to this evaporation.

Figure 2:
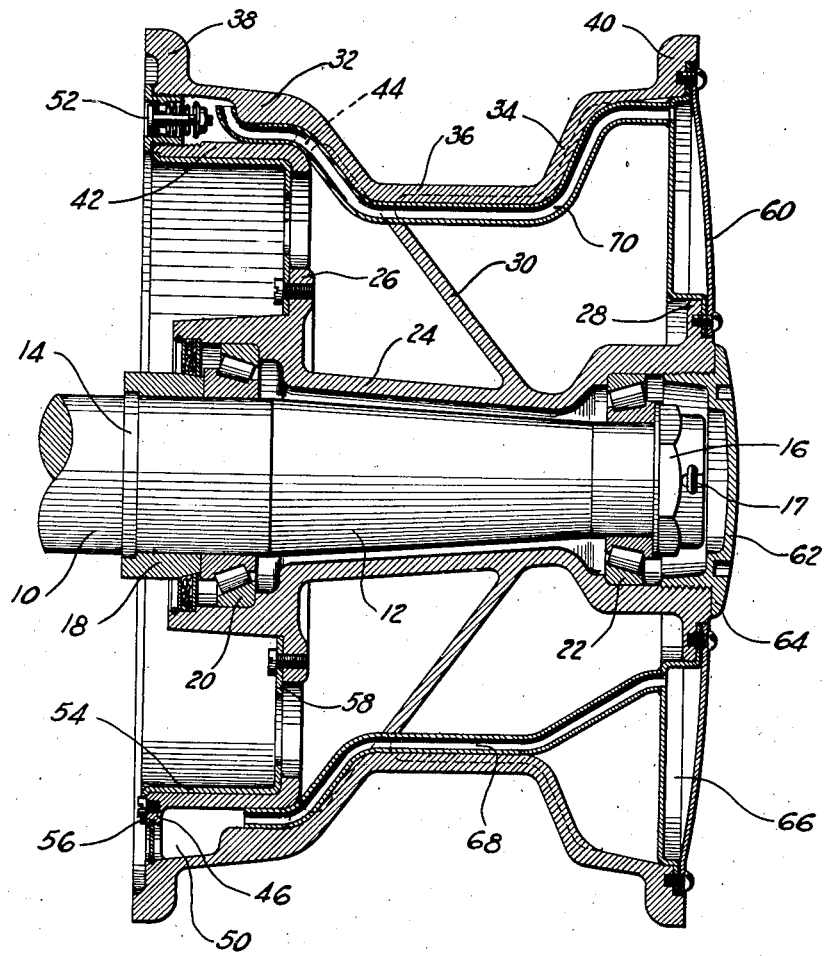
Figure 2 is a vertical sectional view of a wheel illustrating a modification.

A modification of the invention is illustrated in Figure 2. In this modification a condensing chamber 66 is provided on the back of the radial load-carrying disk 60. As shown, the chamber 66 is connected by a tube 68 to the chamber 50 associated with the drum. The tube 68 is connected to the chamber 66 at its inner periphery so that steam will escape from the chamber 50 through the tube 68 to the condenser. The chamber 66 is also connected to the chamber 50 by a tube 70. This tube is connected to the periphery of the condenser and is extended into the chamber 50 with its open end adjacent the outer wall of the chamber 50, so that when condensation takes place in the chamber 66 the fluid will be returned to the chamber 50 due to the centrifugal force imposed on the fluid upon rotation of the wheel causing the fluid to flow through the pipe 70 into the chamber 50.

In operation the chamber 50 is partially filled with water through the valve 52. As the water is heated by the braking effort to the point where the water is vaporized at a higher than atmospheric pressure, it will escape through the tube 68 to the condenser 66 where it is condensed and ejected by centrifugal force through the tube 70 to the chamber 50.

Although this invention has been described in connection with certain specific embodiments, the principles involved are susceptible of numerous other applications which will readily occur to persons skilled in the art. The invention is, therefore, to be limited only as indicated by the scope of the appended claims.

Having thus described the various features of the invention, what I claim as new and desire to secure by Letters Patent is:

1. A wheel comprising a braking flange, a tire supporting rim surrounding the flange, a chamber on the back of the braking flange and within the rim adapted to be filled with water and a blow-off valve for the chamber located in the side thereof.

2. A wheel comprising a braking flange, a tire supporting rim, a chamber between the braking flange and rim, and a blow-off valve communicating with one side of the chamber.

3. A wheel comprising a tire supporting rim, a braking flange, a chamber between the braking flange and the rim, and a blow-off valve for the chamber.

4. A wheel comprising a hub, radial load-carrying disks connecting the hub, a tire carrying rim supported by the disks, a braking flange, a chamber between the braking flange and the rim, and a blow-off valve for the chamber.

5. A wheel comprising a hub, a tire carrying rib, radial load-carrying disks secured to the hub and rim, a braking flange housed by the rim, a sealed chamber between the rim and the braking flange, and a valve communicating with the chamber.

6. A wheel comprising a braking flange, a chamber on the back of the flange, a condenser, and conduits connecting the chamber to the condenser.

7. A wheel comprising a braking flange, a chamber surmounting the braking flange, a condenser, and means connecting the condenser to the chamber.

8. A wheel comprising a rim, a braking flange, a chamber between the braking flange and the rim, and a condenser connected to the chamber.

9. A wheel comprising a hub, radial load-carrying disks on the hub, a rim supported by the disks, a braking flange, a chamber between the braking flange and the rim, and a condenser connected to the chamber.

10. A wheel comprising a hub, a rim, radial load-carrying disks secured to the hub and rim, a braking flange, a chamber between the braking flange and the rim, a condenser associated with one of the radial load-carrying disks, and tubular sections connecting the condenser to the chamber.

11. A wheel comprising a hub, radial load-carrying disks on the hub, a rim supported by the radial load-carrying disks, a braking flange, a chamber between the braking flange and the rim, a condenser associated with one of the radial load-carrying disks, and tubular members connecting the condenser with the chamber.

12. A wheel comprising a hub, radial load-carrying members secured to the hub, a rim supported by the radial load-carrying members, a braking flange supported in one end of the hub, a chamber between the braking flange and the rim, a condenser associated with the radial load-carrying disk in the other end of the hub, and tubular sections connecting the condenser with the chamber.

JOHN R. CAUTLEY.